United States Patent [19]

Gibbons et al.

[11] 4,085,075
[45] Apr. 18, 1978

[54] CARBOHYDRATE THERMOSET RESINS

[75] Inventors: John P. Gibbons, Western Springs; Mutong T. Chiang, Palos Heights, both of Ill.

[73] Assignee: CPC International Inc., Englewood Cliffs, N.J.

[21] Appl. No.: 811,396

[22] Filed: Jun. 29, 1977

Related U.S. Application Data

[63] Continuation of Ser. No. 707,599, Jul. 22, 1976, abandoned.

[51] Int. Cl.² .............................................. C08L 3/02
[52] U.S. Cl. .................................. 260/17.2; 260/17.3
[58] Field of Search .............................. 260/17.2, 17.3

[56] References Cited

U.S. PATENT DOCUMENTS

| | | | |
|---|---|---|---|
| 1,886,353 | 11/1932 | Novotny et al. | 260/17.2 |
| 2,361,438 | 10/1944 | Turner | 260/17.2 |
| 3,197,435 | 7/1965 | Ronay et al. | 260/17.2 |
| 3,865,616 | 2/1975 | Akerblom | 260/17.2 |

*Primary Examiner*—Edward M. Woodberry
*Attorney, Agent, or Firm*—David H. LeRoy; John P. Floyd

[57] ABSTRACT

A resin blend useful in molding compounds wherein a novolak resin, a carbohydrate and an aminoplast are blended with fillers and the like to form a molding composition curable with cross linking agents. Articles molded in the molding composition of the invention have good flow characteristics, physical and mechanical properties, and provide molded articles with uniform, smooth surfaces which can be pigmented with bright colors.

7 Claims, No Drawings

CARBOHYDRATE THERMOSET RESINS

This is a Continuation of application Ser. No. 707,599 filed July 22, 1976, and now abandoned.

This invention relates to carbohydrate-based thermoset resins, and more particularly to thermoset resin systems formulated of a novolak resin, a carbohydrate and an aminoplast.

Condensation resins based upon phenol and aliphatic aldehydes have been used for many years in the plastics industry. One particular form of such phenol-aldehyde resins which enjoys widespread use is the so-called phenol-formaldehyde novolak resin. Such resins are prepared by reaction of excess phenol with formaldehyde in the presence of an acid catalyst to form the novolak resin which is a relatively brittle plastic at room temperature.

The resulting resin is then combined with various molding additives, including fillers and a cross linking agent (usually hexamethylenetetramine). When used as a molding composition to produce articles, the resins have good physical and mechanical properties. For example, it is common practice to blend the phenol-formaldehyde novolak resin with fillers such as calcium oxide, wood flour, silica, etc., along with the curing agent to render the plastic material thermosetting.

Although not used quite as widely as novolak resins, condensation resins prepared by reaction of formaldehyde with either urea or melamine have also been used in molding compositions of the type described above.

The basic raw material for phenolic novolak resins of the type described above is petroleum. As is now well known, supplies of petroleum are becoming increasingly limited, and prices have increased significantly. There is thus a need to replace at least a portion of the petroleum-based components of the novolak resins with a less expensive, more abundant material. Carbohydrates, readily available from plant sources, are thus one type of renewable resource ideally suited for use in the manufacture of plastics.

Up to the present, however, it has been difficult to produce thermoset resin compositions containing carbohydrates in which the carbohydrate does not detrimentally affect the physical and/or chemical properties of the resulting resin. For example, it has been proposed in U.S. Pat. Nos. 2,408,065 and 2,502,520 to blend starch with a melamine-formaldehyde resin. However, articles molded from such compositions do not have sufficient strength for many modern applications.

It is accordingly an object of the present invention to provide a low cost novolak resin system incorporating an inexpensive carbohydrate at relatively high levels of substitution.

It is a more specific object of the invention to provide a novolak resin and molding composition embodying the same in which a portion of the novolak is replaced by a carbohydrate material to provide a molding composition having improved strength properties and water resistance and which is useful for thermoset molding application.

The concepts of the present invention reside in a molding composition which is formulated of (1) a phenol-formaldehyde novolak resin, (2) a carbohydrate compatible with the novolak resin and (3) an aminoplast compatible with the starch which is also capable of serving as a plasticizer for the novolak resin. In the practice of this invention, a novolak resin is blended with the carbohydrate and the aminoplast, and preferably a filler, to form a molding compound having good flowable properties capable of being molded to yield an article having a smooth glossy surface and having good physical and mechanical properties. It has been found that the use of the combination of a carbohydrate and an aminoplast serves to significantly decrease the cost of the molding compound without a significant decrease in the physical and mechanical properties of the resulting molded product.

The phenol-formaldehyde novolak resins employed in the practice of this invention are those typically employed in conventional novolak molding compositions. They are prepared by condensation of phenol with formaldehyde in the presence of an acid catalyst, usually surfuric acid, to form a hard, brittle resin which can be cured with a cross linking agent to yield a thermosetting material. Novolak resins, in contrast to resols, are prepared by using a ratio of aldehyde to phenol less than 1 to thereby produce a thermoplastic resin which can be converted to thermosetting form by use of a curing agent as described above. Resols, on the other hand, are soluble resins prepared by reaction of formaldehyde with phenol wherein the mole ratio of formaldehyde to phenol is greater than 1. Such phenol-formaldehyde novolak resins are commercially available from Acme Resin Company, a unit of CPC International Inc., as well as many other sources.

A number of carbohydrates can be used in the practice of this invention. Preferred is starch since it has been found that starch as an additive provides good mechanical properties, particularly in terms of strength and water resistance. For this purpose, use can be made of cereal starches such as corn starch, grain sorghum and wheat, waxy starches such as waxy milo and waxy maize and root starches such as potato starch and tapioca starch.

Use can also be made of protein-containing starches. For example, corn grits, corn flour, rice flour or mill starch can also be used in the practice of the invention.

As the aminoplast, use can be made of condensation products of a lower aliphatic aldehyde, preferably formaldehyde, acetaldehyde or propionaldehyde with urea or melamine. These aminoplasts can be represented by the structural formula:

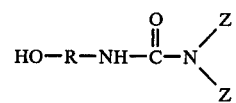

wherein R is a $C_1$ to $C_3$ alkylidene group corresponding to the aldehyde and Z is hydrogen or an alkylol containing 1 to 3 carbon atoms. Included and preferred for use in the practice of this invention are methylol urea and dimethylol urea.

Aminoplasts which are derived from melamine include those having the formula:

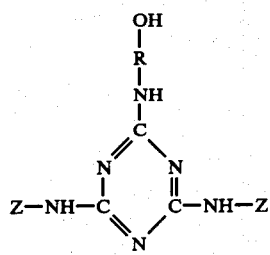

wherein R and Z have the same meaning as set forth above.

Preferred melamine aminoplasts are methylolmelamine, dimethylolmelamine and trimethylolmelamine.

The relative proportions of the novolak, carbohydrate and aminoplast can be varied within relatively wide ranges, depending somewhat upon the intended use of the molding composition. In general, good results are obtained when the molding compound contains 30-80% novolak, and preferably 40-75% novolak, 15-60% carbohydrate, and preferably 20-45% carbohydrate, and 3-20% aminoplast, and preferably 5-15% aminoplast, with each of the percentages specified being percentage by weight based upon the total weight of the novolak, carbohydrate and aminoplast.

In the preferred practice of this invention, the molding composition is formulated with fillers as well as various additives including lubricants, plasticizers and the like as desired. For this purpose, use can be made of wood flour, glass fibers and preferably chopped glass fibers, silica, alumina, asbestos, calcium oxide, etc., as fillers. Lubricants include metal salts of fatty acids, such as calcium stearate and the like. As will be appreciated by those skilled in the art, such fillers, lubricants and like additives are themselves well known to those skilled in the art.

In the practice of this invention, the novolak resin, the carbohydrate and the aminoplast can also be blended with a curing agent to render the resulting composition thermosetting. The preferred curing agent is the well-known hexamethylenetetramine, although numerous other curing agents may likewise be used, if desired. The various components of the composition are simply blended together in suitable blending equipment of the sort well known to the art, and then molded and cured in accordance with conventional techniques.

The invention is further illustrated by the following examples, which, however, are not to be taken as limiting in any respect. All parts and percentages, unless expressly stated to be otherwise, are by weight.

EXAMPLE 1

This example illustrates the practice of this invention using starch and trimethylolmelamine as additives to a novolak resin. For purposes of comparison, there is processed in the same manner a composition where no starch or aminoplast is added, and that test is presented as a control.

Two molding compounds are weighed and then mixed to form a uniform mixture which is then milled on a two-roll mill at 200° F for 2 minutes to produce fusible homogeneous sheets. The milled sheets are then ground in a Waring blender to a fine powder which is molded into bars measuring ½ × ½ × 5 inches in a laboratory press at 350° F for 5 minutes.

The resulting bars for both the invention and the control experiment are measured, and the results, along with the compositions of the molding compound, are set forth below.

|  | Invention | Control |
|---|---|---|
| Novolak (Acme Ex3757) | 11.5 g | 23 g |
| Starch 3005 | 8.63 g | — |
| Trimethylolmelamine | 2.87 g | — |
| Hexamethylenetetramine | 2.5 g | 2.5 g |
| Calcium oxide | 0.5 g | 0.5 g |
| Calcium stearate | 0.5 g | 0.5 g |
| Wood flour | 22.5 g | 22.5 g |
| Flexural Modulus, psi | $11.3 \times 10^5$ | $11.0 \times 10^5$ |
| Water Resistance (2 hr., boiling water) | | |
| Water absorption, % | 4.61 | 2.0 |
| Weight loss, % | 0.0 | 0.0 |

As can be seen from the foregoing data, the amount of novolak employed in the molding compound of this invention was half that of a composition without starch and an aminoplast, and yet the physical properties of the resulting molded bars are not significantly affected.

EXAMPLE 2

Using the procedure described in Example 1, the control experiment is repeated, and Test A, using one half the amount of novolak as the control experiment, and Test B, using one third the amount of the novolak as the control experiment, are placed by starch and trimethylolmelamine.

Molding compounds and test specimens are prepared as described in Example 1, and the compositions of the molding compounds and the properties of the test specimens are set forth in the following table:

|  | Control | Test A | Test B |
|---|---|---|---|
| Novolak (Acme Ex3757) | 48 | 24 | 32 |
| Starch 3005 | — | 18 | 12 |
| Trimethylolmelamine | — | 6 | 4 |
| Hexamethylenetetramine | 5 | 5 | 5 |
| Calcium oxide | 1 | 1 | 1 |
| Calcium stearate | 1 | 1 | 1 |
| Wood flour | 45 | 45 | 45 |
| Water Resistance (2 hr., boiling water) | | | |
| Water absorption, % | 1.7 | 2.9 | 2.2 |
| Weight loss, % | 0.0 | 0.0 | 0.0 |
| 24 hr. - 23° C Immersion | | | |
| Water absorption, % | 0.54 | 1.35 | 0.89 |
| Weight loss, % | 0.0 | 0.0 | 0.0 |
| Mechanical Properties (as is) | | | |
| Flexural Modulus, psi × $10^5$ | 10.2 | 11.0 | 10.4 |
| Flexural Strength, psi | 12,200 | 9,700 | 11,600 |
| Mechanical Properties after Boiling in Water for 2 hrs. | | | |
| Flexural Modulus, psi × $10^5$ | 10.6 | 9.3 | 10.0 |
| Flexural Strength, psi | 11,300 | 13,000 | 11,800 |

Thus, comparable results are obtained in this experiment.

As will be appreciated by those skilled in the art, mixtures of the foregoing urea and melamine derivatives can likewise be used.

EXAMPLE 3

Using the same procedure as described in Example 2, novolak resin molding compounds are prepared, using both starch and trimethylolurea and starch and dimethylolurea to replace one half and one third of the novolak resin normally used.

On molding, the following properties were determined:

|  | Test C | Test D | Test E | Test F |
| --- | --- | --- | --- | --- |
| Novolak (Acme Ex3757) | 24 | 32 | 24 | 32 |
| Starch 3005 | 18 | 12 | 18 | 12 |
| Trimethylolurea | 6 | 4 | — | — |
| Dimethylolurea | — | — | 6 | 4 |
| Hexamethylenetetramine | 5 | 5 | 5 | 5 |
| Calcium oxide | 1 | 1 | 1 | 1 |
| Calcium stearate | 1 | 1 | 1 | 1 |
| Wood flour | 45 | 45 | 45 | 45 |
| Water Resistance 24 hr. - 23° C Immersion |  |  |  |  |
| Water Absorption, % | 1.88 | 1.02 | 1.66 | 1.22 |
| Weight loss, % | 0.0 | 0.0 | 0.0 | 0.0 |
| Mechanical Properties |  |  |  |  |
| Flexural Modulus, psi × $10^5$ | 11.0 | 11.0 | 9.8 | 10.6 |
| Flexural Strength, psi | 10,900 | 12,300 | 11,700 | 13,600 |

EXAMPLE 4

Using the same procedure as described in the preceding examples, various proportions of a novolak resin are replaced by a blend of starch and trimethylolmelamine.

The composition of the starch-trimethylolmelamine blend was 72 g of starch (CPC grade 3005), 24 g of trimethylolmelamine and 4 g of calcium stearate. Two different blends, I and II, are prepared.

I. This blend is prepared by molding the mixture on a rubber mill at 250° F for 2 minutes, and then grinding the resulting mixture into powder.

II. This blend is prepared by mixing the ingredients in 100 ml of water for 15 minutes and then vacuum drying the mixture at 30° C.

The molding compounds are prepared by mixing 88 g of wood flour with 12 g of blends I and II. The resulting molding compound is molded in ASTM D-647 die at 350° F for 7 minutes to produce a test specimen.

Compositions of the various tests as well as the control experiments and the physical properties of the resulting test specimens are set forth below.

|  | Control | Test G | Test H |
| --- | --- | --- | --- |
| Wood Flour | 88 g | 88 g | 88 g |
| Phenolic Resin (Compounded) | 12 g | 9 g | 6 g |
| Blend I | — | 3 g | 6 g |
| Water Resistance 24 hr., 23° C immersion |  |  |  |
| Water absorption, % | 9.1 | 10.2 | 12.6 |
| Weight loss, % | 0.4 | 0.8 | 0.6 |
| Mechanical Properties |  |  |  |
| Flexural strength, psi | 12,000 | 11,200 | 10,800 |
| Flexural modulus, psi × $10^5$ | 10.5 | 9.4 | 9.0 |

|  | Test X | Test K | Test L |
| --- | --- | --- | --- |
| Wood Flour | 88 g | 88 g | 88 g |
| Phenolic Resin (Compounded) | 9 g | 8 g | 6 g |
| Blend II | 3 g | 4 g | 6 g |
| Water Resistance 24 hrs., 23° C immersion |  |  |  |
| Water absorption, % | 10.9 | 14.7 | 15.7 |
| Weight Loss, % | 0.9 | 1.3 | 1.4 |
| Mechanical Properties |  |  |  |
| Flexural strength, psi | 11,150 | 11,600 | 10,900 |
| Flexural modulus, psi × $10^5$ | 10.2 | 9.8 | 8.8 |

EXAMPLE 5

Using the procedure described in Example 1, novolak resin molding compounds are prepared, using starch-/methylolmelmaine (2.5 moles formaldehyde per mole melamine) to replace one half and one third of novolak resin normally used. In addition, 2% of pigment, for example Ciba-Geigy's Irganin Orange RLT or Yellow 2GT, was added to test the pigmentability.

Molding compounds and test specimens are prepared as described in Example 1, and the compositions of the molding compounds and the test specimens are set forth in the following table.

|  | Test 1 |  | Test J |  |
| --- | --- | --- | --- | --- |
| Novolak (Acme Ex3757) | 24 |  | 32 |  |
| Starch 3005 | 18 |  | 12 |  |
| Methylolmelamine | 6 |  | 4 |  |
| Hexamethylenetetramine | 5 |  | 5 |  |
| Calcium oxide | 1 |  | 1 |  |
| Calcium stearate | 1 |  | 1 |  |
| Wood flour | 45 |  | 45 |  |
| Pigment | Orange RLT | 2 | Yellow 2GLT | 2 |
| Water Resistance (24 hr. 23° C immersion |  |  |  |  |
| Water absorption, % | 1.18 |  | 0.91 |  |
| Weight loss, % | 0 |  | 0 |  |
| Flexural Modulus; psi × $10^5$ | 11.4 |  | 10.0 |  |
| Flexural Strength; psi | 10,000 |  | 12,700 |  |

Moldability of the compounds was tested by ASTM D-731 cup mold. Both compounds were molded into a cup of uniform, smooth surface. In addition, the compounds had an excellent pigmentability, and the molded cups developed a bright appealing orange or yellow color.

EXAMPLE 6

Using the procedure described in Example 1, novolak resin molding compounds are prepared, using starch-/methylolmelamine (2.5 moles formaldehyde per mole melamine) to replace one half of novolak resin, and various fillers, such as asbestos fibers, wood cellulose, titanium dioxide, were used in place of wood flour.

Molding compounds and test specimens are prepared as described in Example 1, and the compositions of the molding compounds and the test specimens are set forth in the following table.

|  | Test K | Test L | Test M |
| --- | --- | --- | --- |
| Novolak | 24 | 24 | 24 |
| Starch 3005 | 18 | 18 | 18 |
| Methylolmelamine | 6 | 6 | 6 |
| Calcium oxide | 1 | 1 | 1 |
| Calcium stearate | 1 | 1 | 1 |
| Hexamethylenetetramine | 5 | 5 | 5 |
| Asbestos fiber | 45 | — | — |
| Wood cellulose | — | 45 | — |
| Titanium dioxide | — | — | 45 |
| Water Resistance (24 hr., 23° C immersion) |  |  |  |
| Water absorption, % | 0.13 | 1.19 | 0.18 |
| Weight loss, % | 0 | 0.1 | 0 |
| Flexural modulus, psi × $10^5$ | 17.0 | 11.8 | 11.3 |
| Flexural strength, psi | 11,530 | 11,300 | 8,990 |
| Moldability: |  |  |  |
| ASTM D-731 cup mold | good | good | good |

EXAMPLE 7

Using the procedure described in Example 1, novolak resin molding compounds are prepared, using Mogul starch (containing 5.4% protein) or Amidex B 411 (acid treated, gelatinized starch).

Molding compounds and test specimens are prepared as in Example 1, and the compositions of the molding compounds and test specimens are set forth in the following table.

|                          | Test N | Test O |
|--------------------------|--------|--------|
| Novolak (Acme Ex3757)    | 24     | 24     |
| Mogul Starch             | 18     | —      |
| Amidex B 411             | —      | 18     |
| Trimethylolmelamine      | 6      | 6      |
| Hexamethylenetetramine   | 5      | 5      |
| Calcium oxide            | 1      | 1      |
| Calcium stearate         | 1      | 1      |
| Wood flour               | 45     | 45     |
| Water Resistance         |        |        |
| (24 hr., 23 ± 1° C)      |        |        |
| Water absorption, %      | 0.96   | 1.46   |
| Weight loss, %           | 0      | 0.17   |
| Flexural modulus, psi × $10^5$ | 11.3 | 11.3 |
| Flexural strength, psi   | 9,917  | —      |

While the invention has been described in connection with specific embodiments thereof, it will be understood that it is capable of further modification, and this application is intended to cover any variations, uses, or adaptions of the invention following, in general, the principles of the invention and including such departures from the present disclosure as come within known or customary practice in the art to which the invention pertains and as may be applied to the essential features hereinbefore set forth, as fall within the scope of the invention.

We claim:

1. A solid molding composition comprising:
   (1) a phenol-formaldehyde novolak resin;
   (2) a starch; and
   (3) an aminoplast compatible with the starch selected from the group consisting of urea derivatives of the formula:

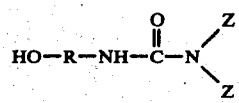

and melamine derivatives of the formula:

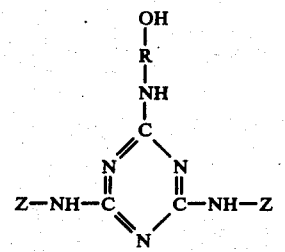

wherein R is a $C_1$ to $C_3$ alkylidene group and Z is hydrogen or $C_1$ to $C_3$ alkylol.

2. A composition as defined in claim 1 wherein the molding compositions contains 30–80% by weight of the novolak, 15–60% by weight of the starch and 3–20% by weight of aminoplast, based upon the total of (1), (2) and (3).

3. A composition as defined in claim 1 which includes a filler.

4. A composition as defined in claim 1 which includes a lubricant.

5. A composition as defined in claim 1 which includes a curing agent.

6. A composition as defined in claim 5 wherein the curing agent is hexamethylenetetramine.

7. A composition as defined in claim 1 wherein the aminoplast is selected from the group consisting of methylolurea, dimethylolurea, trimethylolurea, dimethylolmelamine, trimethylolmelamine and mixtures thereof.

* * * * *